March 1, 1966 C. F. GERLETZ 3,237,242
ROLL-FED THERMOFORMING MACHINE
Original Filed May 15, 1963 5 Sheets-Sheet 1
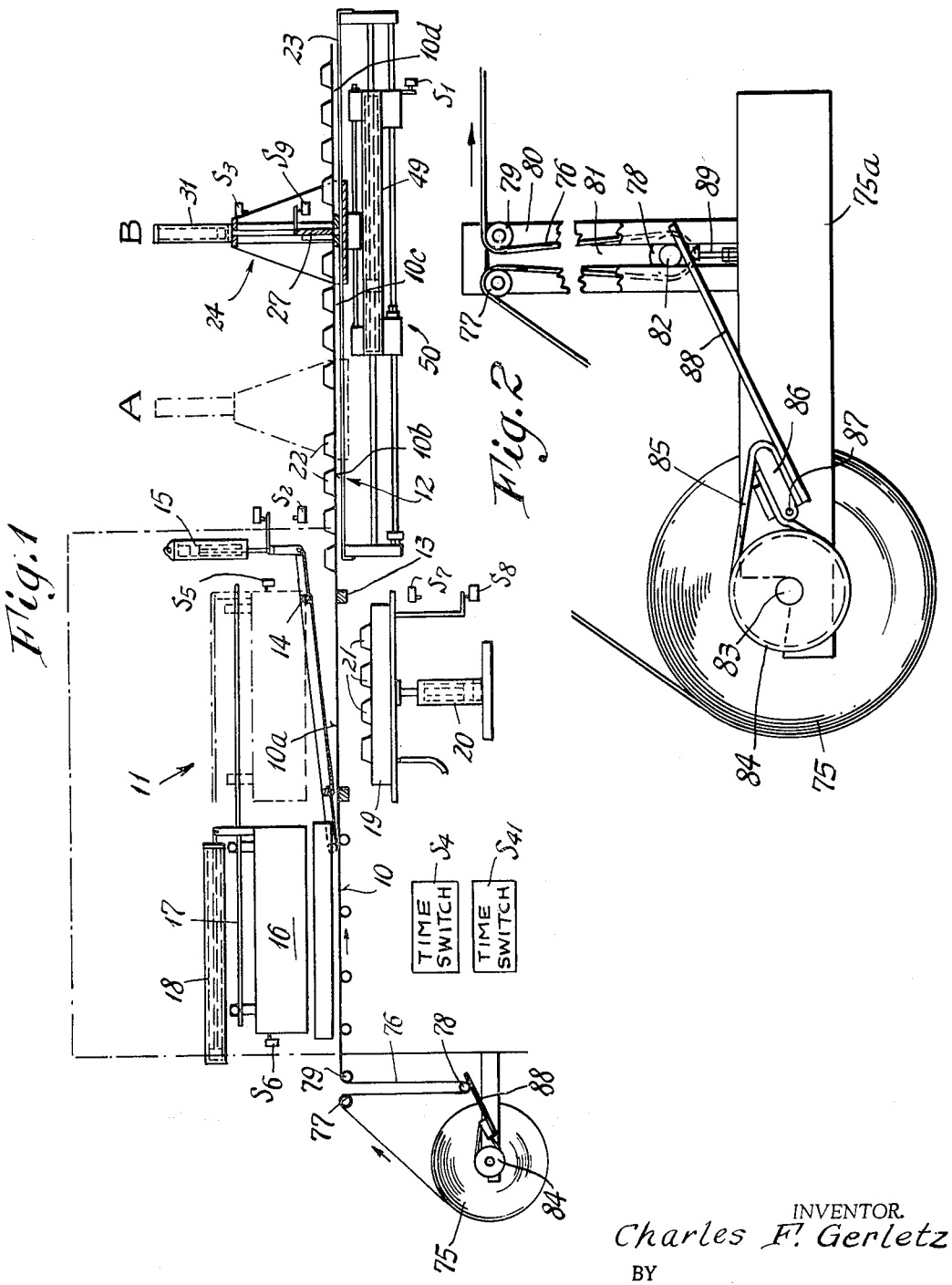
INVENTOR.
Charles F. Gerletz
BY
Johnson and Kline
ATTORNEYS

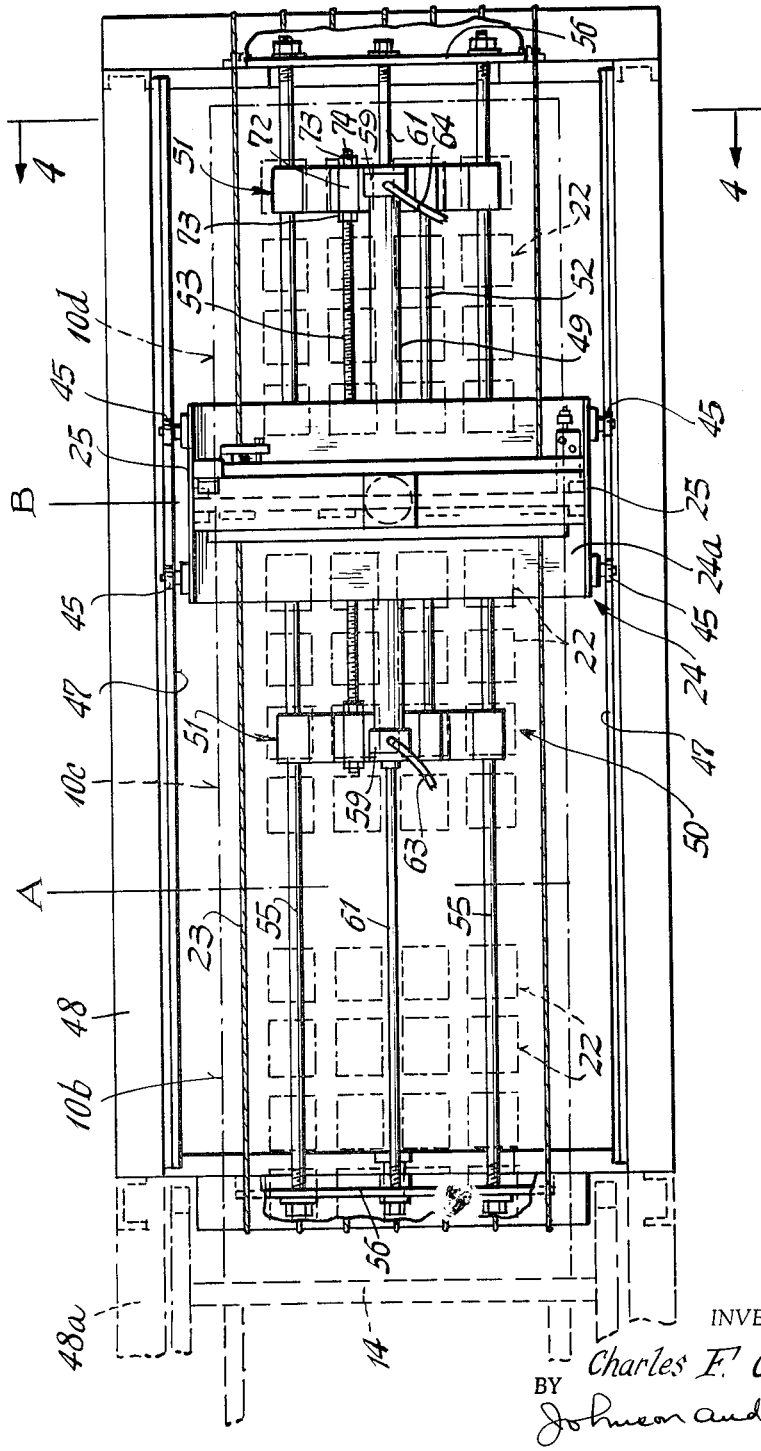

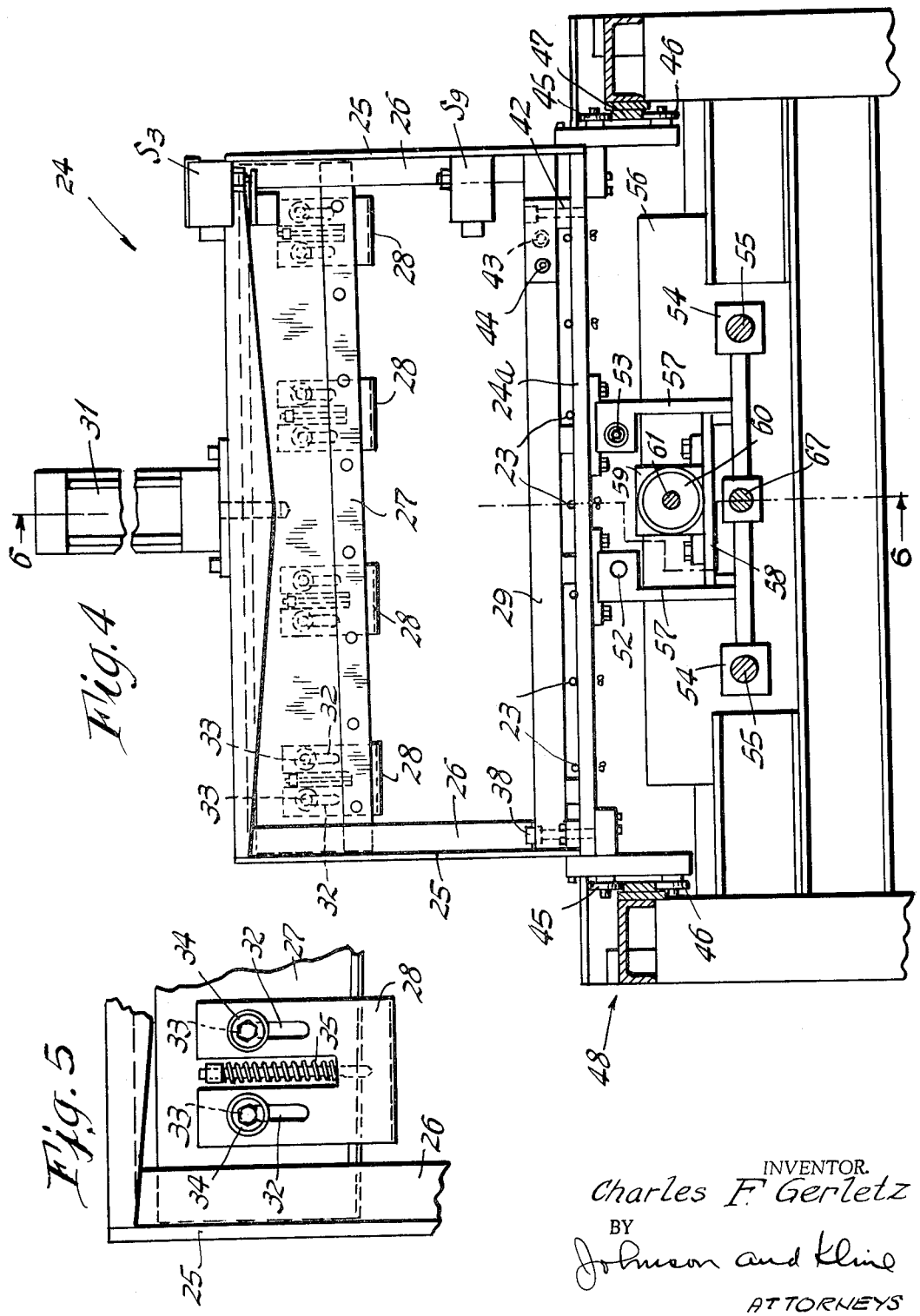

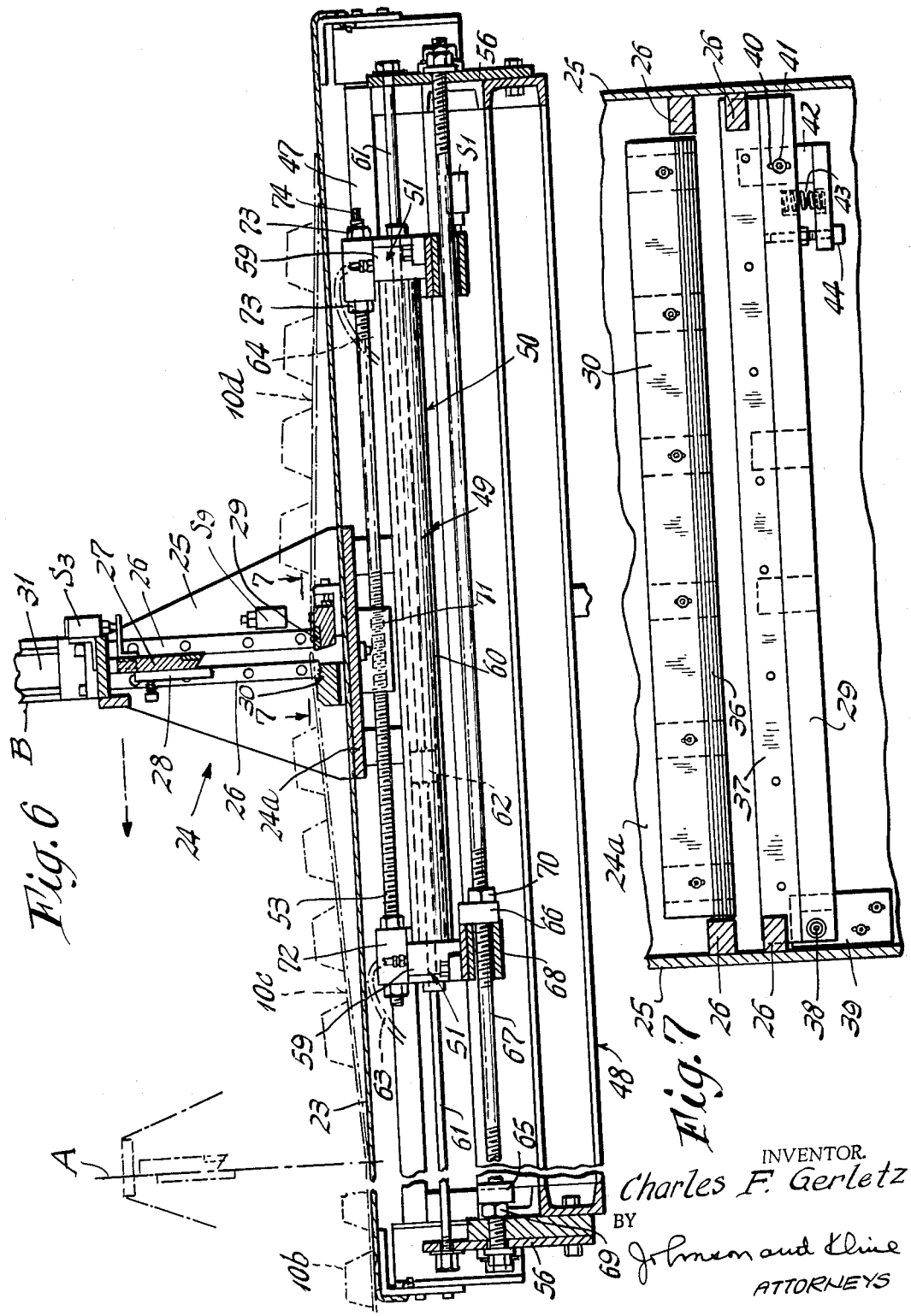

March 1, 1966 C. F. GERLETZ 3,237,242
ROLL-FED THERMOFORMING MACHINE
Original Filed May 15, 1963 5 Sheets-Sheet 5

INVENTOR.
Charles F. Gerletz
BY
Johnson and Kline
ATTORNEYS

United States Patent Office 3,237,242
Patented Mar. 1, 1966

3,237,242
ROLL-FED THERMOFORMING MACHINE
Charles F. Gerletz, Bridgeport, Conn., assignor to National Cleveland Corporation, Cleveland, Ohio, a corporation of Ohio
Original application May 15, 1963, Ser. No. 280,523. Divided and this application Feb. 11, 1965, Ser. No. 436,987
9 Claims. (Cl. 18—4)

This application is a division of co-pending application Serial No. 280,523, filed May 15, 1963.

This invention relates to a novel apparatus for controlling, feeding and severing into sections of determinate lengths a continuous web of thermoplastic material in a thermoforming machine.

With the present and future requirements of this art in mind, it is an object of the present invention to provide improved apparatus, capable of continuous and rapid automatic operation, for the treatment of continuous webs of thermoplastic material.

It is another object of this invention to provide improved apparatus, capable of continuous and rapid automatic operation, for the feeding of a continuous thermoplastic web, the molding thereof into blister- or skin-packaging material, and the cutting of such molded film into sections of desired length.

It is still another object of this invention to provide improved apparatus of the aforementioned type in which the means for cutting the molded plastic web into sheets may be adjusted in simple and accurate manner in order to accommodate mold patterns of different sizes and provide molded sections or sheets of the desired length.

It is yet another object of the invention to provide improved apparatus for the treatment of a continuous plastic web in which the plastic web, drawn from a plastic supply roll, is maintained in a satisfactory taut condition as it passes to the molding station.

These and other objects and advantages of the present invention will be apparent to those skilled in the art in the light of the following description including the accompanying drawings in which:

FIGURE 1 is a schematic side elevation of the automatic plastic web treatment apparatus of the present invention.

FIG. 2 is an enlarged view of the plastic web supply means indicated in FIG. 1.

FIG. 3 is a top plan of the plastic web-shearing and indexing means of the present apparatus.

FIG. 4 is an end view of the plastic web-shearing and indexing means partly in section taken along the lines 4—4 of FIG. 3.

FIG. 5 is a front view of a part of the cutter blade and gripper assembly shown in FIG. 4.

FIG. 6 is a longitudinal section of the plastic web-cutting and indexing means taken along the lines 6—6 of FIG. 4.

FIG. 7 is a horizontal section taken on the lines 7—7 of FIG. 6.

Figure 8:
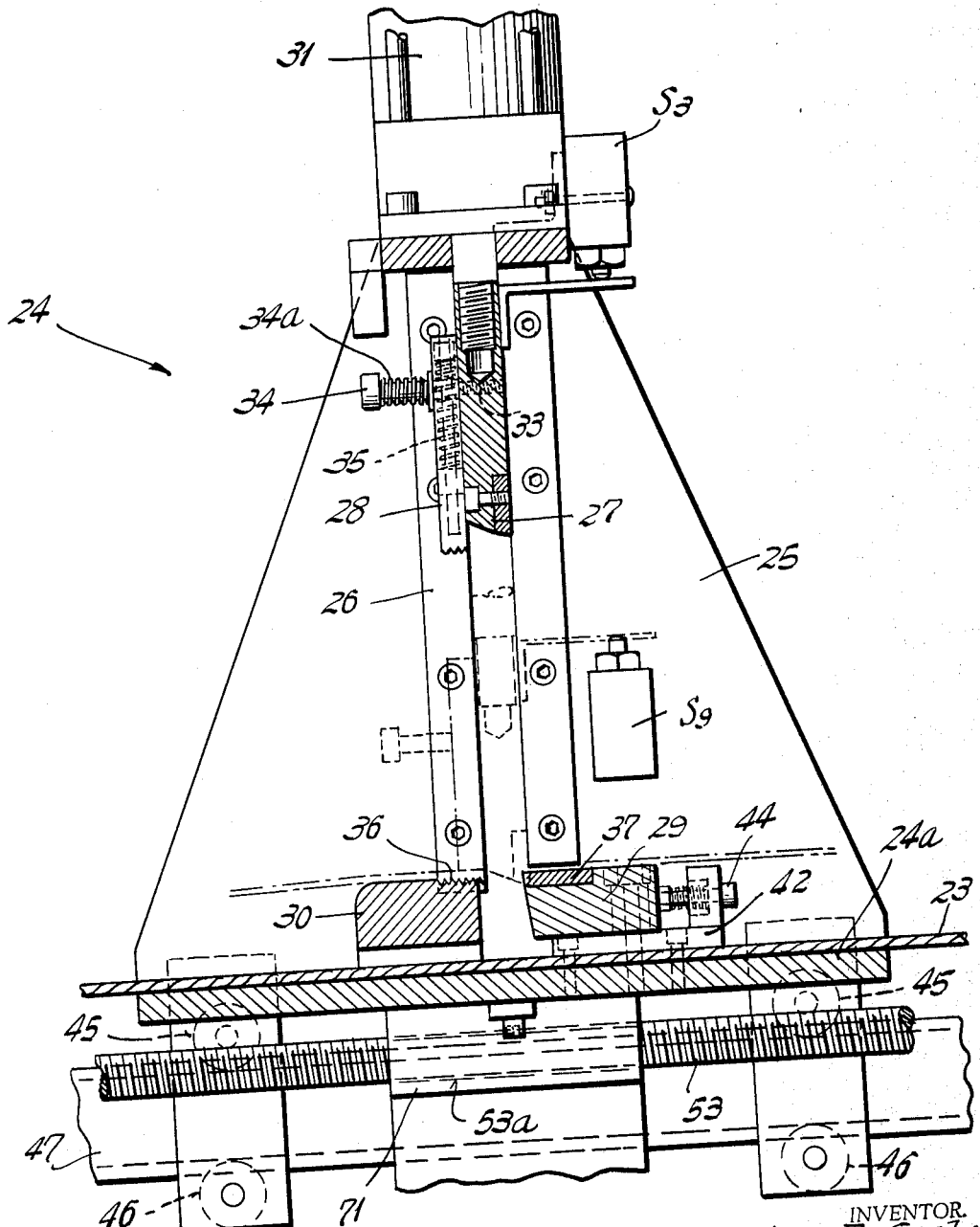
FIG. 8 is an enlarged vertical section of the plastic web-cutting and indexing means of FIG. 6.

As schematically illustrated in FIG. 1, a continuous web 10 of thermoplastic material, herein called the plastic web, is guided through a heating and molding station 11 and onto a delivery table 12.

The heating and molding station 11 includes a lower clamping frame 13 over which the web 10 passes and an upper clamping frame 14 hinged on the station 11 and operated by a pneumatic cylinder and piston device 15 to clamp the web to the frame 13 in molding position. When the web is thus clamped, a heater box 16 is caused to travel on rails 17 by means of a pneumatic cylinder and piston device 18 from the full line position shown in FIG. 1 to the broken line position where the portion 10a of the web is heated and caused to drape.

The heater box 16 is then returned to its full line position and a vacuum table 19 is elevated by a pneumatic cylinder and piston device 20 to bring the molds 21 thereon against the thermally softened portion 10a of the web and at the same time the vaccum table 19 is caused to make an airtight engagement with the frame 13. Vacuum is then applied to the vacuum table and the portion 10a is formed over the molds 21. When the portion 10a has been molded, the vacuum table 19 is lowered, the clamping frame is raised and the web is advanced toward the delivery table 12 one sheet length, the advanced sheet length being the section 10b (FIG. 1) of the web having the molded forms 22 thereon. Any sagging of the web on the delivery table 12 is prevented by longitudinally extending spaced supporting members 23.

According to the present invention, the web is advanced step-by-step at sheet-length intervals by improved web-indexing and cutting mechanism which is carried by the delivery table 12 and which includes a web-gripping and shearing carriage 24. The web-clamping and cutting carriage, see FIG. 6, comprises a base 24a and vertical side members 25 having guides 26 in which there is slidably mounted for vertical movement a sheering knife 27 which also carries a plurality of clamping members 28. The knife 27 cooperates with a relatively fixed cutter bar 29 on the carriage and the clamping members 28 cooperate with a fixed clamping bar 30 also mounted on the carriage 24. The bars 29 and 30 extend for the full width of the carriage 24 and the web 10 and close to the member 23 on the delivery table so that the web may pass over the bars 29 and 30 as illustrated diagrammatically in FIGS. 6 and 8. The position of the knife 27 relative to the clamping members 28 is such that the latter engage the bar 30 and firmly grip the web before the knife 27 engages the web over the cutter bar 29.

The knife 27 and the clamping members 28 are reciprocated vertically by a pneumatic cylinder and piston device 31.

According to the present invention, the clamping members 28, as shown in FIG. 5, are slidably mounted on the knife bar 27 for vertical movement. Each clamping member 28 is in the form of a bifurcated plate having elongate slots 32 through which extend guiding and attaching screws 33 which are threaded in the knife bar and have heads 34 spaced from the bar 27 sufficiently to receive a spring 34a which holds the clamping member to the bar and permits the clamping member to slide vertically. The members 28 are yieldingly pressed downwardly by springs 35 to the limit of their movement controlled by the screw 33.

When the knife bar 27 descends and the bottoms of the members 28 engage the web, the members 28 may yield but still forceably hold the web under the influence of the springs 35 against the clamping bar 30 while the edge of the knife continues to travel to shear a formed section from the web.

As shown in FIGS. 7 and 8, the clamping bar 30 has a transversely serrated surface 36 for engaging the lower surface of the web and holding it against slippage when the upper surface of the web is engaged by the clamps 28. Also, as shown in FIGS. 7 and 8, the knife bar 29 has a hardened blade portion 37.

According to the present invention, the knife bar 29 is pivotally mounted at 38 on an adjustable plate 39 while at the other end the knife bar has an elongate slot 40 through which passes a screw 41 which holds the movable end of the knife bar against a supporting block 42 but permits movement of the knife bar on the axis of its pivot 38. The block 42 carries a spring 43 which urges the knife bar in a counterclockwise direction until the head of a bolt 44 carried in said bar 29 engages the block, there being sufficient clearance between the block and the knife bar to permit the knife bar to yield in a clockwise direction against the tension of the spring 43 in cutting the plastic web. By this arrangement the knife bar 29 is self-sharpening by reason of its scissor-like engagement with the knife bar 27.

The carriage 24 includes upper wheels 45 and lower wheels 46, see FIGS. 6 and 8, which engage and ride on rails 47 carried by a supporting frame 48 and is reciprocated horizontally between positions A and B indicated in FIGS. 1 and 6 by a fluid-operated cylinder and piston device 49 described below.

FIG. 1 shows the carriage 24 in the position which it occupies at the end of the web-feeding operation with the clamping frame 14 raised and the vacuum table lowered. When the carriage 24 reaches this position, the clamping frame 14 is lowered to clamp the section 10a and hold the web against movement. Then the knife 27 and clamping member 28 are raised by the pneumatic device 31 and the carriage 24 is moved by the pneumatic cylinder device 49 until the position A is reached in which the knife and clamping bar will be located over the space between the molded section 10b and a previously molded section 10c (FIG. 1). The knife and clamping bar are then caused by operation of the pneumatic device 31 to descend to clamp the leading edge of the section 10b and to sever the section 10c from the section 10b. The carriage 24 is held in that position while the section 10a of the web is being molded. After the clamping frame 14 has been raised and the vacuum table lowered through the operation of the pneumatic device 20, the carriage is advanced to a position B which causes the web clamped to the carriage to advance one section length, the section marked 10d in FIG. 1, which has just been severed being pushed ahead of the web by the knife and being accessible for removal from the delivery table for stacking etc. When the carriage 24 arrives at position B, the operations above referred to are repeated.

The gripping and cutting carriage 24 is caused to travel along the rails 47 from position A to position B (FIG. 1) to advance the web one section length and to return to position A by a subcarriage 50. This subcarriage 50 has spaced end bars 51 which are tied together in spaced relation by rods 52 and 53 and having bearings 54 slidably mounted on rods 55 which extend parallel with the delivery table and are anchored in plates 56 forming part of the framework 48 of the device. The end bars 51 also have upright arms 57 (see FIG. 4) and transverse bars 58 supporting heads 59 of a cylinder 60 which extends parallel with the delivery table and the rods 55. A piston rod 61 anchored in the plates 56 extends through the cylinder and carries within the cylinder a piston 62 located between the ends of the piston rod. Flexible conduits 63 and 64 are connected to the interior of the cylinder 60 through the heads 59 and may conduct fluid under pressure to opposite sides of the piston 62 to cause the subcarriage to travel between positions A and B.

According to the present invention, the extent of the reciprocating movements of the subcarriage 50 are controlled by stops 65 and 66 carried by a rod 67 which extends parallel to the length of the delivery table and extends through an apertured block 68 carried by the end members 51 of the subcarriage. The rod 67 is anchored in the plates 56 and is threaded to receive stops nuts 69 and 70. By adjusting the stop nuts 69 and 70 along the threaded rod 67, the position of the stops 65 and 66, which may be made of elastic material, may be varied, thereby limiting the movement of the subcarriage by the engagement of the adjacent block 68 with the stops. Thus the travel of the subcarriage 50 both as to length and range may be varied according to the requirements of the particular operation to be performed.

According to the present invention, the gripping and cutting carriage 24 may be coupled to the subcarriage 50 in such a way that the actual position of the knife 27 and gripping member 28 with relation to the web and the subcarriage may be accurately controlled by adjustment of the former in infinitely small increments relative to the latter.

For this purpose, the base 24a of the carriage 24 has secured to its lower surface a lug 71 which has a threaded aperture through which the rod 53 extends and the threads of which engage threads 53a on the rod. The threaded ends of the rod 53 extend through bosses 72 of the end bars 51 and are secured in place by nuts 73. Upon loosening the nuts 73, the threaded rod 53 may be rotated by applying a tool to its projecting end 74 for instance, and thereby advance or retract the carriage 24 relative to the subcarriage 50, thus providing a virtual micrometer control of the position of the carriage 24 with its knife and grippers relative to the subcarriage 50.

It should be understood that while the indexing and shearing device and its supporting frame 48 may be built as an integral part of the frame 48a of a thermoforming machine, it may also be supplied as a separable unit to be connected to the thermoforming machine frame as an attachment.

As shown in the accompanying drawings, the continuous web of thermoplastic material is supplied from a roll 75 mounted on a suitable frame member 75a at the introductory side of the machine, the leading edge of the web being led to the heating and molding station and to the delivery table.

Another feature of this invention is the provision of means for controlling the tension of the portion of the web in the molding station independently of the drag placed on the web by the roll 75 when it is being unwound. To do this, a drape or loop 76 in the web is provided for by guiding the web over a roller 77 under a dancing roller 78 and over a roller 79 before it enters the heating and molding station. The rollers 77 and 79 have bearings in suitable brackets 80 which have vertical slots 81 in which stub shafts 82 on the ends of the dancing roller 78 ride. When the advancement of the web begins due to the inertia of the roll 75, the slack is taken from the loop or drape 76 causing the roller 78 to rise more or less in the slot 81. As the movement of the web continues and the roll 75 starts to unwind, the tension of the web is controlled by the weight of the dancing roller 78 which gradually descends towards its starting position. When the feeding of the web ceases, the roller descends to the position shown in FIG. 2 and at the same time causes a brake to be applied to a spindle 83 of the roll 75.

During the advancement of the web its position and movement is controlled by the carriage 24 to which it is clamped. As soon as the carriage reaches the end of its feeding movement, the clamping frame 14 is caused to descend and clamp the web against further movement. Thus the web is constantly under the control of either the clamping member 28 on the carriage 24 or the clamping frame 14.

The braking of the supply roll 75 is, in the form of the invention herein illustrated, controlled by a brake drum 84 secured to the spindle of the roll 75 being engaged by a brake band 85 connected to a rocker arm 86 pivotally mounted at 87 to the frame member 75a so that when the arm 86 is rotated on its pivot 87 in a clockwise direction the brake will be applied and when rotated in a counterclockwise direction the brake will be released. To operate the rocker arm, it is provided with an extension 88 which is engaged by the stub shaft 82 of the dancing roller 78. The arrangement is such that as the dancing roller approaches its lowermost position it engages the extension 88 and gradually increases the braking force until the dancing roller reaches its lowermost position controlled by a stop 89.

This is an important feature of the present invention since it prevents overrunning and unwinding of the supply roll which could cause the loop thus formed to fall on the floor or other objects and be kinked or otherwise damaged. Further, overrunning of the roll may produce a slack in the stretch of the web leading to the clamping frame 14 which could wrinkle or be damaged.

By the combination of controls, whereby the web is prevented from retrograde movement by the clamping frame 13–14 or the clamping members 28, and action of the dancing roller and brake, the tension and hence the tautness of the web as it passes from the roll 75 to and in the molding station 11 is positively controlled. The pneumatic devices 15, 18, 20, 31 and 49 are controlled by devices known to the art including switch-controlled electrically operated valves (not shown) to carry out automatically a complete cycle of operations which will be clear by reference to the electrical switch employed.

Starting with the completion of the web-feeding operation of the carriage 24, a switch 31 is closed by engagement with the subcarriage 50 causing the pneumatic device 15 to return the clamping frame 14 to web-clamping position. When this occurs, a switch S2 is closed by the clamping frame 14 causing the pneumatic device 18 to move the heater box 16 over the clamping frame and also causing the pneumatic device 31 to raise the knife bar 27 and clamping members 28 clear of the molded web. When the knife bar is moved to raised position, switch S3 causes the pneumatic device 49 to return the carriage to position A and hold it there by the continued application of pneumatic pressure.

In the meantime, when the heater box reached its position over the clamping frame 13–14, an electric time switch S4 was started by operation of switch S5. After the lapse of a predetermined time during which the plastic web is heated, the pneumatic device 18 is operated to return the heater box 16 which operates switch S6 causing the pneumatic device 20 to raise the vacuum table 19. When the table is raised, it closes a switch S7 which causes the vacuum to be applied to the table to form the web to desired shape. Switch S7 also closes a circuit to the timer switch S41 so that after a predetermined time the pneumatic device 20 is caused to lower the vacuum table 19, closing switch S8 which causes pneumatic device 31 to force the knife bar 27 and clamping members 28 down to clamp the web on the leading end of section 10b and shear the section 10c from the section 10b. This movement of the knife operates a switch S9 which causes the pneumatic device 15 to raise the frame 14 thereby releasing the web and actuating the switch S10, the latter causing the pneumatic device 49 to advance the web one section-length, and when the sub-carriage reaches position B the cycle of operations is repeated.

While the foregoing description and the accompanying drawings illustrate the present apparatus in the form at present preferred, it should be understood that the substitution of various other equivalent details for those specifically illustrated herein will be apparent to those skilled in the art in view of the present description and within the spirit and scope of the following claims.

I claim:

1. An indexing attachment for advancing section-by-section a thermoplastic web from a supply roll through the forming station of a thermoforming machine having a clamping frame to hold the web at said forming station, said attachment comprising means attachable to one end of the machine for supporting the supply roll and guiding the web therefrom to the forming station and said clamping frame; a frame attachable to the delivery end of the machine; a delivery table on the frame to receive the formed leading end of the web; a gripper carriage mounted on the frame to travel along the latter; web-gripping means mounted on the carriage and movable to engage and disengage the web between formed sections thereof; means for reciprocating the carriage through a section-length distance; means causing the gripping means to engage the web between said section-lengths when the carriage is in retracted position while the clamping frame engages and holds the web at the forming station; means for causing the carriage to advance one section-length when the forming operation has been completed and the clamping frame disengages the web to bring a fresh portion of the web to the forming station, said means for supporting the supply roll and guiding the web to the forming station comprising means for maintaining a uniform drag on the portion of the web between said supply roll and the web-gripping means on said carriage as the web is advanced a section-length by the advancing movement of the carriage and thereby control the tautness of the section of the web between the supply roll and the gripping means on the carriage; means for causing the clamping frame to reengage the web; and means for causing the gripping means on the carriage to disengage the web and the carriage to be retracted one section-length.

2. An indexing attachment according to claim 1 in which the means for maintaining a drag on the web comprises a dancing roller engaging a loop of the web and a brake mechanism effective on the web roll, the braking effect of which is controlled by the rise and fall of the dancing roller whereby overrunning of the roll is prevented.

3. A web tensioning device for maintaining substantially uniform tautness in a web between a supply roll thereof and the working station of a forming machine independently of the drag place on the web by the inertia of the supply roll, and for preventing overrunning of the supply roll, the forming machine having an intermittently operable feed mechanism for feeding the web to and through the working station of the forming machine in predetermined section lengths, said device comprising: a frame, means rotatably supporting said supply roll on said frame, means on said frame forming a loop in the web between said supply roll and the working station of the forming machine, said means including movable means for varying the length of said loop in response to relatively small variations in the drag tending to be imposed on the web by the intermittent operation of the forming machine feed mechanism, thereby maintaining a substantially uniform tautness in the web, a brake mechanism for applying a variable braking effect upon said supply roll supporting means, and means operable in response to movement of said movable means for alternately gradually actuating and releasing said brake mechanism whereby said braking effect is gradually applied to said supply roll as the length of said loop approaches a predetermined maximum when the forming machine feed mechanism is inoperative, and the braking effect is gradually released when the length of said loop decreases below said maximum when the forming machine feed mechanism is operative to feed a section length of the web therethrough thereby preventing overrunning of the supply roll.

4. A web tensioning device for maintaining substantially uniform tautness in a web between a supply roll thereof and the working station of a forming machine independently of the drag place on the web by the inertia of the supply roll, and for preventing overrunning of the supply roll, the forming machine having an intermittently operable feed mechanism for feeding the web to and through the working station of the forming machine in predetermined section lengths, said device comprising: a frame, means rotatably supporting said supply roll on said frame, means on said frame forming a loop in the web between said supply roll and the working station of the forming machine, said means including movable follower means engaging said loop for increasing the length of said loop when the drag on the web decreases below a predetermined minimum and for permitting a decrease in the length of said loop when the drag on the web increases above a predetermined maximum, both said increase and decrease in drag tending to be imposed on the web by the intermittent operation of the forming machine feed mechanism, thereby maintaining a substantially uniform tautness on the web, a brake mechanism for applying a variable braking effect upon said supply roll supporting means, and means operable in response to said increase and decrease in the length of said loop for respectively gradually actuating and releasing said brake mechanism whereby said braking effect is gradually applied to said supply roll as the length of said loop approaches a predetermined maximum when the forming machine feed mechanism is inoperative, and the braking effect is gradually released when the length of said loop decreases below said maximum when the forming machine feed mechanism is operative to feed a section length of the web therethrough, thereby preventing overrunning of the supply roll.

5. A device as set forth in claim 4 wherein said follower means comprises a dancing roller engaging the bottom of said loop, said roller being guided for vertical reciprocatory movement in said frame between a top and a bottom position, said roller having sufficient weight to cause withdrawal of the web from said supply roll when said dancing roller is moved away from said bottom position by movement of the web through the working station of the forming machine and when said brake mechanism is released thereby.

6. A device as set forth in claim 4 wherein said brake mechanism comprises a drum mounted on said supply roll supporting means and rotatable therewith, and a brake band surrounding said drum and having one end fixedly secured to said frame and the other end secured to said actuating and releasing means whereby, upon movement of the latter, the drum is alternately gripped and released by the brake band.

7. A device as set forth in claim 4 wherein said actuating and releasing means comprises a rocker arm pivotally mounted on said frame and engageable by said follower means as the latter increases the length of said loop toward a predetermined maximum, said rocker arm being effective to gradually actuate said brake mechanism when said rocker arm is engaged by said follower means.

8. A device as set forth in claim 4 further including stop means for limiting the application of said braking effect when the length of said loop reaches said predetermined maximum.

9. A web tensioning device for maintaining substantially uniform tautness in a web between a supply roll thereof and the working station of a forming machine independently of the drag placed on the web by the inertia of the supply roll, and for preventing overrunning of the supply roll, the forming machine having an intermittently operable feed mechanism for feeding the web to and through the working station of the forming machine in predetermined section lengths, said device comprising: a frame, means rotatably supporting said supply roll on said frame, means on said frame forming a loop in the web between said supply roll and the working station of the forming machine, said means including a dancing roller guided for vertical reciprocatory movement in said frame between a top and a bottom position, said dancing roller having sufficient weight to cause withdrawal of the web from said supply roll when said dancing roller is moved away from said bottom position by movement of the web through the working station of the forming machine, thereby increasing the length of said loop when the drag on the web decreases below a predetermined minimum, and for permitting a decrease in the length of said loop when the drag on the web increases above a predetermined maximum, both said increase and decrease in the drag tending to be imposed on the web by the intermittent operation of the forming machine feed mechanism, thereby maintaining a substantially uniform tautness on the web, a brake mechanism comprising a drum mounted on said supply roll supporting means and rotatable therewith, and a brake band surrounding said drum and having one end fixedly secured to said frame and the other end adapted to be moved in response to movement of said dancing roller for applying a variable braking effect upon said supply roll supporting means, and actuating means interposed between said dancing roller and said other end of said brake band comprising a rocker arm having one end pivotally mounted to said frame and having the other end connected to said other end of said brake band, and means on said rocker arm disposed in the path of movement of said dancing roller adjacent but spaced from said bottom position of said dancing roller so as to be engaged and moved thereby when said dancing roller moves through a lowermost portion of said path of movement, said brake band being adjusted such that the braking effect thereof is fully applied when said dancing roller is in said bottom position and is fully released when said dancing roller is moved through said lowermost portion and out of engagement with said rocker arm, whereby said braking effect is gradually applied to said supply roll supporting means as said dancing roller moves through said lowermost portion and approaches said bottom position when the forming machine feed mechanism is inoperative, and the braking effect is gradually released as said dancing roller moves through said lowermost portion away from said bottom position when the forming machine feed mechanism is operative to feed a section length of the web therethrough, thereby preventing overrunning of the supply roll.

References Cited by the Examiner
UNITED STATES PATENTS

| | | | |
|---|---|---|---|
| 2,559,705 | 7/1951 | Borkland | 18—19 |
| 3,059,810 | 10/1962 | Edwards | 18—19 |

J. SPENCER OVERHOLSER, *Primary Examiner.*

M. L. McBAY, *Assistant Examiner.*